United States Patent [19]

Itagaki

[11] Patent Number: 4,956,708
[45] Date of Patent: Sep. 11, 1990

[54] FRAME MEMORY CONTROL SYSTEM

[75] Inventor: Hirokazu Itagaki, Tokyo, Japan

[73] Assignee: Oki Electric Industry Co., Ltd., Tokyo, Japan

[21] Appl. No.: 362,280

[22] Filed: Jun. 6, 1989

[30] Foreign Application Priority Data

Jun. 9, 1988 [JP] Japan .............................. 63-140509

[51] Int. Cl.$^5$ .............................................. H04N 7/01
[52] U.S. Cl. ..................................... 358/140; 358/160
[58] Field of Search .................. 358/140, 11, 153, 160

[56] References Cited

U.S. PATENT DOCUMENTS 4,364,090 12/1982 Wendland ............................ 358/140
4,602,275 7/1986 Smith ..................................... 358/11

OTHER PUBLICATIONS

Kobayashi, "Development of a 256K-Bit Dual-Port Memory Permitting Uninterrupted Serial Output for Frame Buffer Use," Nikkei Electronics, pp. 211–240, Aug. 12, 1985.

Kumagaya et al., "Work-Station Display Enhancement by Dual-Port Memory and Gate Array," Nikkei Electronics, pp. 225–252, Jun. 30th, 1986.

Primary Examiner—Howard W. Britton
Attorney, Agent, or Firm—Spencer & Frank

[57] ABSTRACT

A frame memory control system includes independent row address counters for generating first and second row addresses, and selectors for selecting one or the other of these addresses, enabling data to be transferred to the frame memory at one rate and read out of the frame memory at another rate. For interlaced scanning, field detection circuits detect even and odd fields and generate signals which can be substituted for the most significant bits of the row addresses under control of an interlaced-mode signal, so that even-field data can be stored in one half of the frame memory and odd-field data in the other. This frame memory control system utilizes the frame memory efficiently, and can be employed with both sequential-scanning and interlaced-scanning raster display devices.

5 Claims, 3 Drawing Sheets

FRAME MEMORY CONTROL SYSTEM

BACKGROUND OF THE INVENTION

This invention relates to a control system for a frame memory that temporarily stores data to be displayed on a raster display device.

Computing systems such as personal computers and work stations commonly employ a raster display device such as a cathode-ray tube which is scanned in a series of horizontal raster lines. Image data are written by the computing system in a frame memory, from which they can repeatedly be read out and sent to the raster display device, thereby refreshing the image on the display screen. When standard, single-port memory elements are used, write access cycles are interspersed as necessary between display access cycles, or executed during retrace blanking periods of the raster display.

Recently high-resolution raster devices displaying up to 2000 dots in both the horizontal and vertical directions have come into use. The rate at which these displays must be kept refreshed with display data strains the capabilities of single-port memory elements and leaves little time for write access. The frame memories of such systems therefore employ dual-port memory elements having a parallel port for write access and a serial port for display access.

Besides supplying output data at the rates required by by high-resolution raster displays, these dual-port memories alleviate restrictions on write access timing, since write access via the parallel port can take place at the same time as output via the serial port. These dual-part memories necessitate complex control systems, however, because write access and display access take place at different speeds, and the write access addresses and the display access addresses must be generated separately. A particular control problem arises because the raster display device may employ either sequential scanning, in which the rasters are scanned in sequence from the top to the bottom of the screen, or interlaced scanning, in which first the even-numbered rasters are scanned, and then the odd-numbered rasters are scanned.

Prior-art control systems, consisting of a write address generator, a display address generator, and a selector for selecting either the write address or the display address, are built for use with a particular type of display: either sequential or interlaced. Thus they lack general applicability. In the case of interlaced scanning, some prior-art control systems also lack means for efficient memory utilization.

SUMMARY OF THE INVENTION

It is accordingly an object of the present invention to control a frame memory efficiently, in a way that is compatible with both sequential and interlaced scanning.

A frame memory control system according to this invention receives an INL signal that indicates whether the scanning mode is sequential or interlaced and a T/D signal that that differentiates between write transfer access and display access, and comprises a column address counter for providing a column address to the frame memory, a first field detection circuit for generating a FLDDET(T) signal that differentiates between even and odd fields in interlaced scanning, a first row address counter for generating a first row address, a first selector for selecting either the FLDDET(T) signal or the most significant bit of the first row address according to the INL signal and furnishing the selected signal as output, a second field detection circuit for generating a FLDDET(D) signal that differentiates between even and odd fields in interlaced scanning, a second row address counter for generating a second row address, a second selector for selecting either the FLDDET(D) signal or the most significant bit of the second row address according to the INL signal and furnishing the selected signal as output, a third selector for selecting the output of the first selector or the output of the second selector according to the T/D signal and furnishing the selected signal to the frame memory, and a fourth selector for selecting either the lower bits of the first row address or the lower bits of the second row address according to the T/D signal and furnishing the selected bits to the frame memory.

DETAILED DESCRIPTION OF THE EMBODIMENTS

A novel frame memory control system embodying the present invention will be described with reference to the drawings. The functions of this frame memory control system are to generate write addresses for parallel data transfer from a video data generating device to a frame memory, and display addresses for reading data from the frame memory to a raster display device such as a cathode-ray tube.

Figure 1:
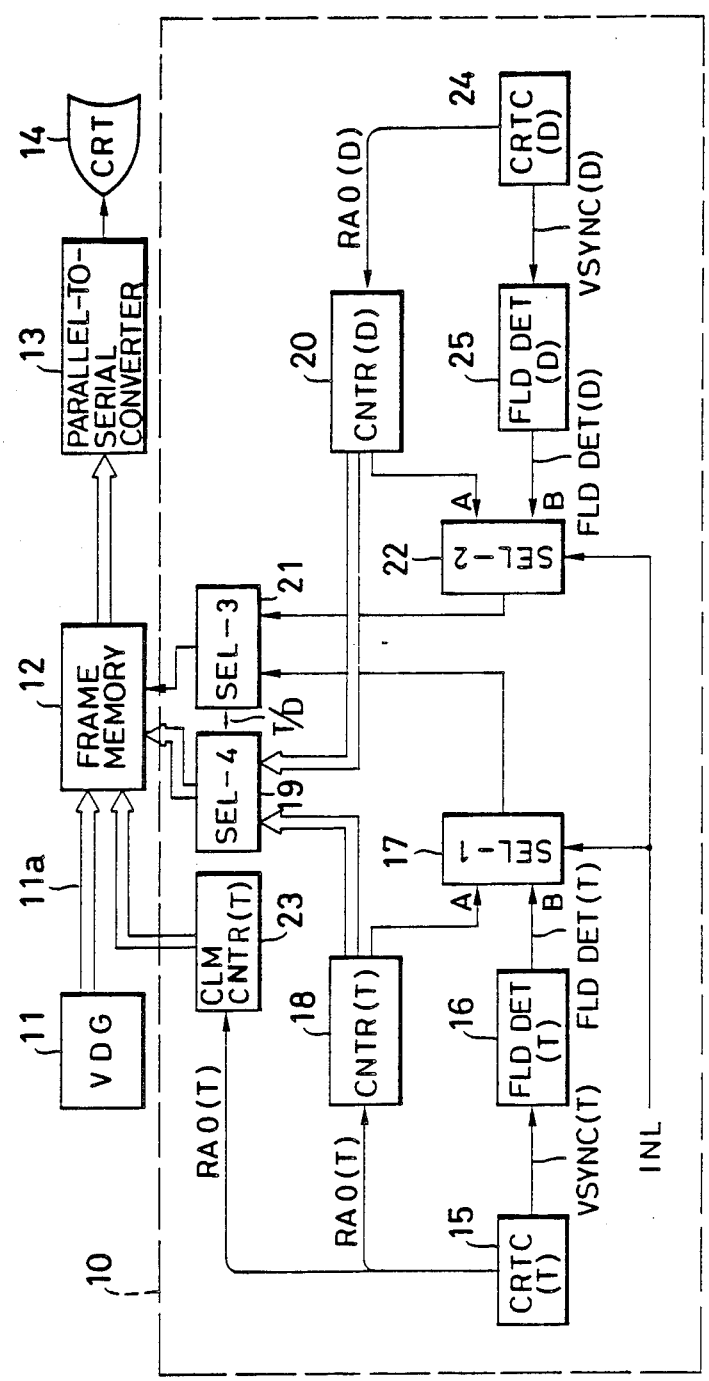
FIG. 1 is a block diagram of a novel frame memory control system.

FIG. 1 is a block diagram of the novel frame memory control system. The frame memory control system 10 comprises blocks labeled T (Transfer) for generating write addresses, blocks labeled D (Display) for generating display addresses, and two selector blocks labeled neither T nor D for selecting either write or display addresses.

The display data are created by a video data generator 11, which sends the data via a bus 11A to a frame memory 12 in which they are stored at addresses supplied by the frame memory control system 10. The data are then read from the frame memory 12 to a parallel-to-serial converter 13 comprising shift registers for converting the data from parallel form to serial form. If the frame memory 12 comprises dual-port memory elements, the parallel-to-serial converter 13 and the frame memory 12 may be integrated onto the same microelectronic chips. The converted data are sent from the parallel-to-serial converter 13 to a raster display device 14, which may be a cathode-ray-tube device.

Figure 3:
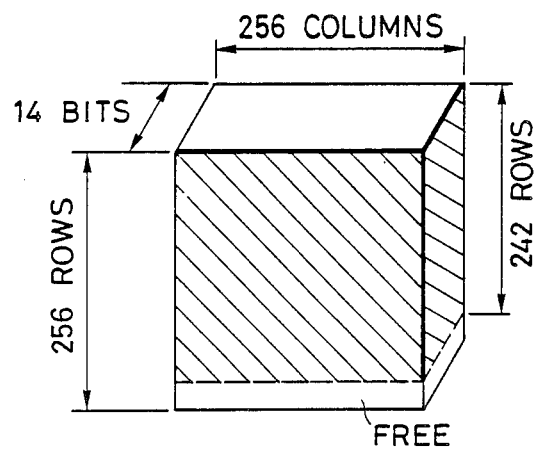
FIG. 3 illustrates the storage of data in the frame memory in the sequential scan mode.
Figure 4:
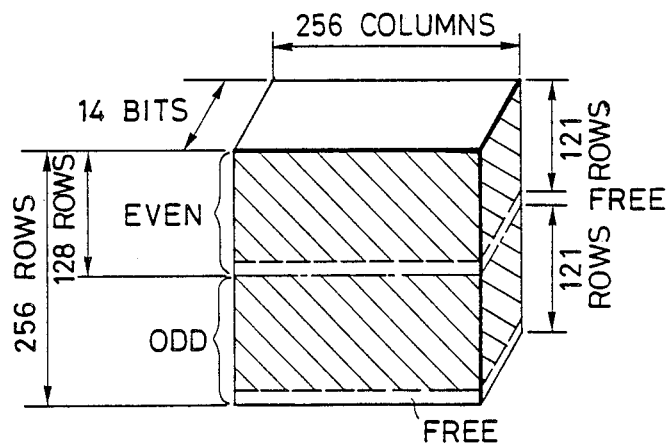
FIG. 4 illustrates the storage of data in the frame memory in the interlaced scan mode.

As an example of the display and memory structure of this system, the raster display device 14 may display rectangular frames of 754 rasters, each raster comprising 1148 dots. The frame memory 12 may comprise four 256K-bit dual-port memory elements with a 64K×4 bit configuration, thus having a total capacity of one megabit comprising 65,536 words of 16 bits each. In FIGS. 3 and 4, these 65,536 words will be shown as structured in a square array comprising 256 rows and 256 columns.

This row-column structure is internal to the frame memory 12, and is not related to the raster structure on the display screen. A row is the number of bits transferred at one time from the frame memory 12 to the parallel-to-serial converter 13. The bus 11A may be a 14-bit parallel data bus, data being stored in 14 of the 16 bits in each word in the frame memory 12. Thus when the video generator writes data in the frame memory 12, it writes one word at a time, two of the bits in the word being unused. When data are read from the frame memory 2 to the parallel-to-serial converter 13, one row is transferred at a time.

The frame memory control system 10 receives an interlace (INL) mode signal that indicates whether the raster display device 14 uses sequential scanning or interlaced scanning, and a transfer/display (T/D) control signal that differentiates between write transfer access and display access. The INL and T/D signals can be generated by the video data generator 11 or by other circuits not shown in the drawing.

The transfer control blocks (T) and the two unlabeled selector blocks in the frame memory control system 10 will be described next in detail. This detailed description will be followed by a less detailed description of the display control blocks (D), which are similar to the transfer control blocks.

The first transfer control block is a first CRT controller 15 that generates a vertical synchronization signal VSYNC(T). The VSYNC(T) signal is a pulse signal that, in interlaced scanning, occurs at the start of every even field, comprising data for the even rasters on the display screen, and the start of every odd field, as well as data for the odd rasters on the display screen. The first CRT controller 15 also generates a raster address zero signal RA0(T) indicating the first raster that will actually be displayed on the display screen. The first CRT controller 15 can be a microelectronic chip such as the HD46505 manufactured by Hitachi, Ltd.

The VSYNC(T) signal from the first CRT controller 15 is sent to a first field detection circuit 16 which, in interlaced scanning, detects whether the field identified by the VSYNC(T) signal is even or odd and generates a FLDDET(T) signal that differentiates between even or odd fields. The FLDDET(T) signal is applied to the B input of a first selector 17.

The first selector 17 receives and is controlled by the INL signal, which causes it to select either its A or B input and provide the selected signal as output.

The RA0(T) signal from the first CRT controller 15 is sent to a first row address counter 18 that generates a first row address signal. The row address counter 18 may be, for example, an eight-bit up-counter. The RA0(T) signal initializes the row address counter 18 to a starting value such as zero. The most significant bit of the first row address output by the first row address generator 18 is applied to the A input of the first selector 17.

The lower bits of the first row address generated by the first row address counter 18, comprising all the bits except the most significant bit, are sent to a fourth selector 19. (The second and third selectors will be described later.) The fourth selector 19 receives the T/D signal, on the basis of which it selects either the lower bits of the first row address received from the first row address counter 18 or the lower bits of a second row address signal to be described later. The bits selected by the fourth selector 19 are applied as address bits to the frame memory 12.

A third selector 21 also receives the T/D signal, and selects accordingly either the output signal selected by the first selector 17, or an output signal selected by a second selector 22 to be described later. The signal selected by the third selector 21 is applied as an address signal to the frame memory 12.

The RA0(T) signal generated by the first CRT controller 15 is also applied to a column address counter 23, initializing this counter at the same time as the first row address counter 18 is initialized. The column address counter 23 may be, for example, an eight-bit up-counter. The count output by the column address counter 23 is a column address signal, which is also applied to the frame memory 12.

From the blocks market T in the frame memory control system 10, the frame memory 12 thus receives an address signal comprising the most significant bit of the first row address generated by the first row address counter 18 or the FLDDET(T) signal as its most significant bit, the lower bits generated by the first row address counter 18 as its next bits, and the bits generated by the column address counter 23 as its final bits. Data transferred from the video data generator are stored at the location addressed by this address signal.

The display control blocks marked (D) are similar to the corresponding blocks market (T), except that there is no second column address counter. The second row address counter 20 generates a second row address, of which the most significant bit is applied as the A input to the second selector 22, and the other bits are sent to the fourth selector 19. A second CRT controller 24 generates a vertical synchronization signal VSYNC(D) and a raster address zero signal RA0(D) that specifies the address of raster 0 on the raster display device 14. The second CRT controller 24 can be a microelectronic chip identical to the first CRT controller 15. The RA0(D) signal initializes the second row address counter 20, which generates a second row address signal, the most significant bit of which is applied to the A input of the second selector 22. The VSYNC(D) signal is sent to a second field detection circuit 25, which detects whether the current field is an even field or odd field and generates a FLDDET(D) signal that is applied to the B input of the second selector 22. The second selector 22 receives the INL signal, according to which it selects either the most significant bit of the second row address generated by the second row address counter 20 or the FLDDET(D) signal from the second field detection circuit 25 and sends the selected signal to the third selector 21. The lower bits of the second row address are sent to the fourth selector 19, as mentioned earlier.

Figure 2A:
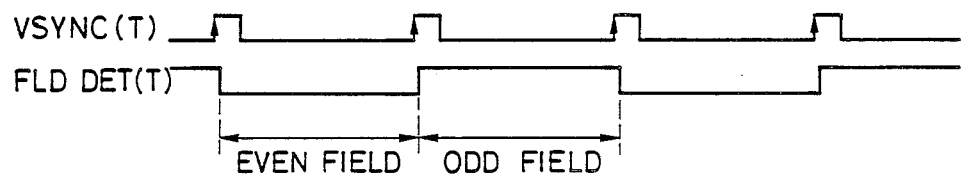
FIGS. 2A and 2B illustrate the operation of the field detection circuits in FIG. 1.
Figure 2B:
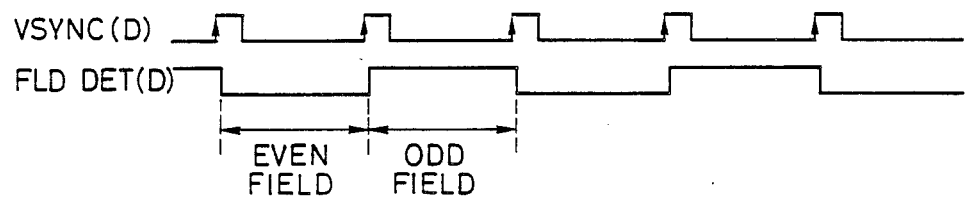

FIGS. 2A and 2B illustrate the way in which the FLDDET(T) and FLDDET(D) signals are generated. The first field detection circuit 16 generates the FLDDET(T) signal by detecting low-to-high transitions of the VSYNC(T) signal and inverting the logic level of FLDDET(T) at each such transition, as shown in FIG. 2A. The second field detection circuit 25 generates FLDDET(D) by detecting low-to-high transitions of the VSYNC(D) signal and inverting the logic level of FLDDET(D) at each such transition, as shown in FIG. 2B. The FLDDET(T) and FLDDET(D) signals are both low (0) in even fields and high (1) in odd fields. The VSYNC(T) pulses and VSYNC(D) pulses may be generated at different rates, enabling data to be read out from the frame memory 12 at a faster rate than they are transferred in, as illustrated in FIGS. 2A and 2B.

Next a write operation comprising the transfer of one frame of data from the video data generator 11 to the frame memory 12 will be described with reference to FIGS. 1, 3, and 4. If the raster display device 14 employs sequential scanning, the frame comprises data for all rasters on the screen in sequence from top to bottom. If the raster display device 14 employs interlaced scanning, the frame is divided into an even field and an odd field. The generation of the addresses at which the data are stored in the frame memory 12 will be described first for the sequential case, then for the interlaced case.

In the sequential case, the INL signal is in the false state (the "0" logic level), causing the first selector 17 to select its A input, thus sending the most significant bit of the row address generated by the first row address counter 18 to the third selector 21. The T/D signal is in the T state, causing the third selector 21 to select the most significant bit of the row address generated by the first row address counter 18, and the fourth selector 19 to select the other bits of the row address generated by the first row address counter 18. The frame memory 12 thus receives the entire row address generated by the first row address generator 18 and the column address generated by the column address generator 23, in consequence of which the frame memory 12 stores the display data generated by the video data generator 11 in a single contiguous area represented by the hatched part of FIG. 3. The remaining area in the frame memory 12 is left free.

For the above-mentioned display and memory structure example, the hatched area comprises a number of bits equal to the 754 rasters×1148 dots on the display screen. This number is substantially equal to 242 rows×256 columns×14 bits, as illustrated in FIG. 3. The frame memory 12 is capable of storing 256 rows×256 columns×14 bits, so the fraction of its area that is utilized is substantially 242/256, which is substantially 94%.

In the interlaced scan mode, the INL signal is in the true state (the "1" logic level), causing the first selector 17 to select its B input, thus sending the FLDDET(T) signal to the third selector 21. The T/D signal is in the T state, causing the fourth selector 19 to select the output of the first row address counter 18, and the third selector 21 to select the FLDDET(T) signal received from the first selector 17. The address received by the frame memory 12 thus comprises the FLDDET(T) signal as its most significant bit, the lower bits generated by the first row address counter 18 as its next bits, and the column address generated by the column address counter 23 as its final bits. By replacing the most significant bit of the row address, the FLDDET(T) signal divides the frame memory 12 into two areas, labeled even and odd in FIG. 4. When FLDDET(T) is low, data are written in the even field area, substantially filling 121 rows×256 columns×14 bits in the case of the above-described display and memory structure example. When FLDDET(T) is high, data are written in the odd field area, again substantially filling 121 rows×256 columns×14 bits. Thus in the interlaced mode, as in the sequential mode, substantially 94% of the frame memory 12 is utilized.

Frame memory utilization is actually a little higher than 94%. The exact amount of data transferred to and stored in the frame memory 12 is 1148/14×754=61,828 words, while the memory capacity is 65,536 words, so memory utilization is 61,828/65,536=94.3%.

Next the reading of data from the frame memory 12 to the parallel-to-serial converter 13 will be described. In a read operation, the T/D signal causes the fourth selector 19 to select the output of the second row address counter 20, and the third selector 21 to select the output of the second selector 22. Under the control of the INL signal, the second selector 22 selects the most significant bit of the output of the second row address counter 20 in the sequential mode and the FLDDET(D) signal in the interlaced mode, as already explained.

In the sequential mode, the frame memory 12 receives the most significant bit of the row address signal generated by the second row address counter 20 via the second selector 22 and the third selector 21, and the other bits of this row address via the fourth selector 19, causing data to be read from the hatched area in FIG. 3 one row at a time to the parallel-to-serial converter 13.

Since an entire row is transferred at once from the frame memory 12 to the parallel-to-serial converter 13, no column address is required. Write operations to the frame memory 12 are inhibited during the transfer of the row, but after the row transfer is completed, write operations may resume while the bits in the row are being output serially from the parallel-to-serial converter 13, the T/D signal switching to T during this time.

In the interlaced mode, the frame memory 12 receives the FLDDET(D) signal in place of the most significant bit of the row address signal, causing data to be read from the two hatched areas in FIG. 4, the upper area containing the even field data and the lower area the odd field data. Aside from this difference, the read operation is the same as in the sequential mode.

The data read from the frame memory 12 are converted to serial form by the parallel-to-serial converter 13, sent to the raster display device 14, and displayed.

This frame memory control system makes efficient use of the frame memory 12 in both the sequential and interlaced scanning modes, and enables display data to be written at a rate suitable for the video data generator while being read at a rate suitable for the display device. Moreover, it is not necessary to provide different frame memory control systems for raster display devices using sequential and interlaced scanning; the same frame memory control system can be used with both types of scanning.

The scope of this invention is not limited to the structures shown in the drawings, but includes many variations and modifications that will be apparent to one skilled in the art. For example, the row-column-word structure of the frame memory and the raster structure of the display device can be other than illustrated above. In addition, it is not necessary for the frame memory to comprise dual-port memory elements. By use of the column address counter during read-out from the frame memory to the parallel-to-serial converter, or by addition of a second column address counter for this purpose, this invention can be modified for use with a frame memory comprising single-port memory elements, controlling such a memory in a manner compatible with both sequential and interlaced scanning.

What is claimed is:

1. A frame memory control system for controlling a frame memory in accordance with an INL signal that indicates whether the scanning mode is sequential or interlaced and a T/D signal that that differentiates between write transfer access and display access, causing said frame memory to receive data at one rate from a video data generator and provide said data at another, possibly different rate to a parallel/serial converter, comprising:

- a column address counter for generating a column address and furnishing said column address to said frame memory;
- a first field detection circuit for generating a FLDDET(T) signal that differentiates between even and odd fields in interlaced scanning;
- a first row address counter for generating a first row address;
- a first selector for selecting either said FLDDET(T) signal or the most significant bit of said first row address according to said INL signal and furnishing the selected signal as output;
- a second field detection circuit for generating a FLDDET(D) signal that differentiates between even and odd fields in interlaced scanning;
- a second row address counter for generating a second row address;
- a second selector for selecting either said FLDDET(D) signal or the most significant bit of said second row address according to said INL signal and furnishing the selected signal as output;
- a third selector for selecting the output of said first selector or the output of said second selector according to said T/D signal and furnishing the selected signal to said frame memory; and
- a fourth selector for selecting either the lower bits of said first row address or the lower bits of said second row address according to said T/D signal and furnishing the selected bits to said frame memory.

2. The frame memory control system of claim 1, wherein said first field detection circuit receives a VSYNC(T) signal for vertical synchronization and inverts said FLDDET(T) signal on each rising edge of said VSYNC(T) signal.

3. The frame memory control system of claim 2, further comprising a first CRT controller for generating said VSYNC(T) signal.

4. The frame memory control system of claim 1, wherein said second field detection circuit receives a VSYNC(D) signal for vertical synchronization and inverts said FLDDET(T) signal on each rising edge of said VSYNC(D) signal.

5. The frame memory control system of claim 4, further comprising a second CRT controller for generating said VSYNC(D) signal.

* * * * *